United States Patent [19]

Meinke et al.

[11] 4,236,426
[45] Dec. 2, 1980

[54] METHOD AND ARRANGEMENT FOR THE TRAVERSING OF THE CRITICAL ROTATIONAL SPEEDS OF ELONGATE ROTORS

[75] Inventors: Peter Meinke, Grossinzemoos; Gernot Zippe, Frankfurt am Main, both of Fed. Rep. of Germany

[73] Assignees: G K T Gesellschaft fur Kernverfahrenstechnik mbH, Jülich; M.A.N. Maschinenfabrik Augsburg-Nürnberg Aktiengesellschaft, Munich, Fed. Rep. of Germany

[21] Appl. No.: 816,800

[22] Filed: Jul. 18, 1977

[30] Foreign Application Priority Data

Jul. 20, 1976 [DE] Fed. Rep. of Germany ....... 2632586

[51] Int. Cl.$^3$ .................... F16F 15/22; H02K 5/24
[52] U.S. Cl. ........................ 74/574; 64/1 V; 188/1 B; 310/51
[58] Field of Search .............. 248/15, 18; 74/574; 73/522, 526; 310/51; 188/1 B; 64/1 V

[56] References Cited

U.S. PATENT DOCUMENTS

| | | | |
|---|---|---|---|
| 2,079,226 | 5/1937 | Sarazin | 74/574 |
| 2,590,579 | 3/1952 | Sarazin | 74/574 |
| 2,978,885 | 4/1961 | Davison | 64/1 V |
| 3,085,817 | 4/1963 | Krause et al. | 64/1 V |
| 3,097,167 | 7/1963 | Beyerle | 74/574 X |
| 3,112,653 | 12/1963 | Morris | 188/1 B |
| 3,216,655 | 11/1965 | Wind et al. | |
| 3,464,657 | 9/1969 | Bullard | 188/1 B |
| 3,614,181 | 10/1971 | Meeks | 308/10 |
| 3,650,581 | 3/1972 | Boden | 308/10 |
| 3,786,694 | 1/1974 | Willeitner | 74/573 |
| 3,804,210 | 4/1974 | Erickson | 188/1 B |
| 3,971,510 | 7/1976 | Morse | 233/27 |
| 4,044,861 | 8/1977 | Abu-Akeel et al. | 188/1 B |
| 4,082,974 | 4/1978 | Yamamoto et al. | 310/51 |

FOREIGN PATENT DOCUMENTS

| | | | |
|---|---|---|---|
| 650441 | 10/1962 | Canada | 74/574 |
| 1143150 | 3/1964 | Fed. Rep. of Germany . | |
| 1292948 | 4/1969 | Fed. Rep. of Germany . | |
| 2253036 | 10/1972 | Fed. Rep. of Germany . | |
| 1042826 | 11/1953 | France | 188/1 B |
| 1295476 | 5/1962 | France | 64/1 V |
| 651904 | 1/1963 | Italy | 188/1 B |
| 1575264 | 1/1970 | Netherlands . | |
| 400957 | 11/1933 | United Kingdom | 310/51 |
| 1192904 | 5/1970 | United Kingdom . | |
| 1398189 | 6/1975 | United Kingdom . | |

*Primary Examiner*—Leslie Braun
*Attorney, Agent, or Firm*—Scully, Scott, Murphy & Presser

[57] ABSTRACT

A method and arrangement for the traversing of critical rotational speeds of elongate rotors. At least one critical frequency altering means in the form of springs, dampers and masses may be operatively connected, singly or in combination, to the rotor to thereby produce a change in the frequencies and/or amplitudes of the rotor, or in the critical rotational speeds and their amplitudes.

32 Claims, 10 Drawing Figures

METHOD AND ARRANGEMENT FOR THE TRAVERSING OF THE CRITICAL ROTATIONAL SPEEDS OF ELONGATE ROTORS

BACKGROUND OF THE INVENTION

1. Field of the Invention

The present invention relates to a method and arrangement for the traversing or passing-through of the critical rotational speeds of elongate rotors.

Supercritically running machines, whose rotors must traverse their flexually critical rotational speeds in order to reach their operative rotational speeds are becoming of increasing significance in the technology. To be mentioned as examples thereof are helicopter shafts, multi-stage gas-steam turbines, as well as other hollow and solid elongate rotating bodies. Usually, such types of rotors must be balanced as well as possible and forced through their critical speeds with increased drive power.

It is known to change the gripping conditions at the bearing support locations so as to provide for short-term variation of the frequencies of the flexural resonances, and to thereby avoid large resonance amplitudes, this being valid for the lowest (basic oscillation) and also their higher oscillations. The change in the gripping or support conditions must be effected at the correct point in time so that, through alternating gripping or release of the rotor during acceleration or deceleration, there are never reached dangerous amplitudes which could bend or even destroy the rotor in an extreme case. The stable rated operating drive is then obtained intermediate two resonance frequencies.

2. Discussion of the Prior Art

A method is known in which the fastening or loosening of the rotor ends is effectuated through the intermediary of controllable bearings or supports. For this purpose there is employed the physical effect in that the frequency of the critical rotational speed for a rotor whose ends are only loosely restrained (gripping condition: "free", "free") lies higher as compared to when one end or both ends are easily rotatable about its longitudinal axis but supported against radial movements. However, this known method, for the control of the correct time point for switching from "free" to "supported" and reversely requires a considerable complex technical construction, so as to be rarely applied in the technology.

A similar effect as that in the change of the restraining conditions at the rotor ends can be achieved through alternating gripping conditions also at the present nodes of the oscillation of the rotor. These arrangements can influence the rotor from externally thereof, for example, by means of contactable rollers, variable electrical or magnetic fields, air forces, gas or liquid forces, or also from the interior of a hollow rotor by means of suitable construction elements. In this instance there also appear the mentioned technical difficulties, when the change must be effected at the correct point in time.

SUMMARY OF THE INVENTION

Accordingly, it is an object of the present invention to develop a simplest possible method which, with the lowest possible power requirement, adequately stabilizes a rotational body during the traversing thereof through the critical rotational speeds.

The foregoing object is inventively attained in that due to radial rotor movement, springs, dampers or attenuators and/or masses are, respectively, directly coupled or uncoupled singly or in combination, in response to the change in the flexural line of the rotor, as auxiliary traversing or critical frequency altering aids upon approach of the rotor to the critical rotational speeds, in such a manner that there is produced a change in the frequencies of the critical rotational speeds and/or their amplitudes.

The sum of the spring resistances and their masses together determine the different critical rotational speeds of the rotating system, in the free as well as also in the coupled condition. In this method, the rotor movement itself is utilized in order to achieve the change of the mentioned frequency determining conditions, without the requirement for complicated control mechanisms. The amplitudes which the system reaches for a predetermines stationary rotational speed are normally directly proportional to the unbalance. The damping changes these critical rotational speeds and, at good correlation, significantly reduces the amplitudes and thereby the necessary drive power requirement. Additionally, the drive forces in the system can be harnessed as traversing aids.

In an advantageous embodiment of the invention, the amplitude increase of the rotor at the locations of the oscillation nodes can be utilized upon approaching critical rotational speeds to activate or deactivate traversing or critical frequency altering aids. In the simplest case this can happen in that a portion of the rotor, whose amplitude increases, approaches towards or brushes against an influencing arrangement, and again releases itself as soon as the amplitude has become smaller. This contacting of the so-called passing-through or traversing aids can be simply carried out at bearing support locations with small diameter in that the rotor is encompassed by the traversing aids with a narrow gap therebetween so that the latter is not contacted as long as the rotor rotates about its support axis, and is contacted as soon as the rotor reaches a predetermined amplitude.

During use the traversing or critical frequency alterting aid can be stationary, or may also be driven so as to additionally accelerate the rotor in the case of contact therewith and to rapidly drive through the critical rotational speed. In the first instance, it is suitable that such traversing aids be utilized at bearing support locations with small diameter and small peripheral speeds, whereas the second type can preferably engage at the rotor circumference. Such traversing aids are not only applicable at the external circumference of the rotor, but also interiorly thereof, and have been proved as being successful.

For rotor acceleration there can advantageously be utilized flywheel-like arrangements which are accelerated by means of relatively small rotors in the phases intermediate the critical rotational speeds of the rotor, and whose excess energy are transferred to the rotor upon contact therewith, and to thereby assist the latter in passing through the critical rotational speed range. Hereby motors with high peak-load capacities can be eliminated for traversing.

The invention further contemplates that the activating and deactivating of the traversing or critical frequency altering aids through amplitude increase when approaching the critical rotational speeds is effected at one or both rotor ends. An oscillating node is found at the rotor ends for basically at each random critical oscillating frequency insofar as the rotor is not restrained at that location. For example, upon the exceeding of a predetermined amplitude, the rotor is slightly raised out of its bearing support, for which there is utilized its inherent stored energy. For instance, the rotor is lifted out of its support cup and is thereby freed, or conversely pressed against a traversing aid and gripped thereby. As soon as the amplitude has again become lower, it drops down again and the old conditions are reinstated.

In the ideal case, the reversing sequence results suddenly or jerkily under the presently predetermined frequency or amplitude. Without employing a complicated control, this procedure is not as ideal since the rotor can any number of times revert back and forth between the two conditions with and without traversing aid (shaking and rattling within the given play present between the rotor and the traversing aid). The components must, for example, be so designed through slidable ball- or friction bearings, so that these loads can be supported for a short term. Moreover, the invention provides that upon impinging against the traversing aids there not only occurs a reflection but, if possible, a concurrent energy withdrawal through suitable damping or attenuation means. The effect of the traversing aids, in accordance with a further embodiment of the invention, may be such that at least one portion of the rotor has its stiffness initially either increased or reduced at increasing amplitude, and then suddenly assumes another or its original stiffness value or coefficient of rigidity.

The invention further has as its object the provision of arrangements for the stabilization of elongate or lengthy rotors, in particular for implementing the inventive method, which facilitate the rotor to traverse or pass through critical rotational speeds.

The foregoing object is inventively attained through the intermediary of traversing or critical frequency altering aids constructed from springs, dampers, and/or masses which are utilized singly or in combination, arranged coaxially with and at predetermined close distance from the rotor, in such a manner that they are either directly coupled on during an amplitude increase and, respectively, again uncoupled. These traversing aids can advantageously contact the rotor in a radial manner. The parameters for the springs, dampings and masses, pursuant to a further embodiment of the invention, can be so correlated with regard to each other so as to be capable of being subjected to different auxiliary parameters for the individual critical rotational speeds. The change in the parameter can be effected through known rotational speed sensors and suitable control apparatus.

The inventive arrangement can be arranged about the rotor or, for hollow rotors, also within the rotor, as described in detail hereinbelow. Depending upon need, there can be applied a plurality of traversing aids along the length of the rotor, preferably distributed along the oscillating nodes.

BRIEF DESCRIPTION OF THE DRAWINGS

Reference to the accompanying description is had in conjunction with the accompanying drawings and showing various embodiments of the invention. The drive motors which act directly on the rotor or through an axis are not essential to the invention and for purpose of clarity are omitted in the drawings. As illustrated.

DETAILED DESCRIPTION

Figure 1:
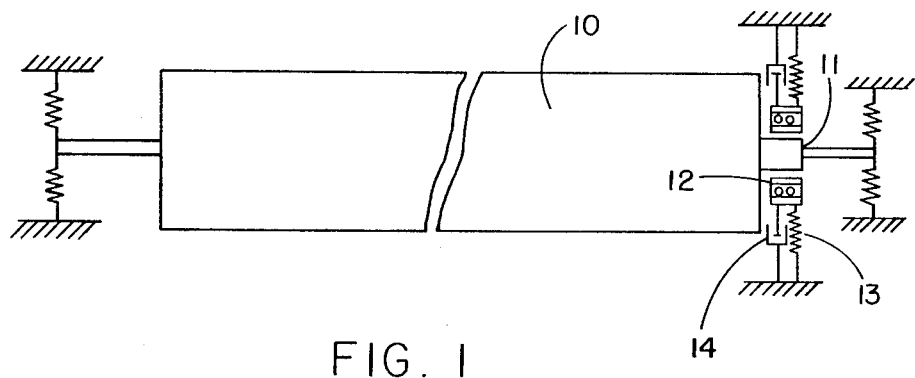
FIGS. 1 and 2 illustrate, respectively, two embodiments of the invention.

Referring now in detail to the drawings, FIG. 1 illustrates a horizontally arranged rotor 10 supported at both of its ends, which evidences a cylindrical extension 11 at one end thereof. Associated with the rotational system is a rotatable ring 12 forming a traversing or critical frequency altering aid, which encompasses the extension 11 with small play therebetween. Ring 12 is resilient, symbolically illustrated through the spring 13, and damped as symbolically illustrated through the piston 14, and is fastened to a component which does not rotate therewith. When the rotor approaches a critical peripheral speed during acceleration or deceleration, the rotor begins to oscillate and to bend in accordance with the magnitude of oscillation. The thus produced localized radial deflections are now employed in order to couple in stabilizing arrangements and thereby for at least a short period displace or shift the flexural frequency through a change in the mass and damping and/or the gripping forces. Achieved hereby is that the rotor oscillates within the different critical frequency ranges, however, it does not reach the amplitudes adhering to the rotor corresponding to the unbalance in the absence of the traversing aids. By means of this relationship, the rotor can be designated as a system which evidences practically no, or at least no dangerous, critical rotational speed ranges, but circumvents these.

Pursuant to FIG. 1, the extension 11, upon the reaching of an oscillating amplitude which exceeds the gap between the ring 12 and the extension 11, will contact and lie against the inner ring 12 of a ball bearing and rotate the latter therewith. Through the coupled on mass, and the additionally applied spring force, there now changes the oscillating system. By means of the damping installations 14 there is additionally withdrawn oscillating energy, so that the rotor can again rapidly assume stable operation, and the ring 12 is again uncoupled.

Figure 2:
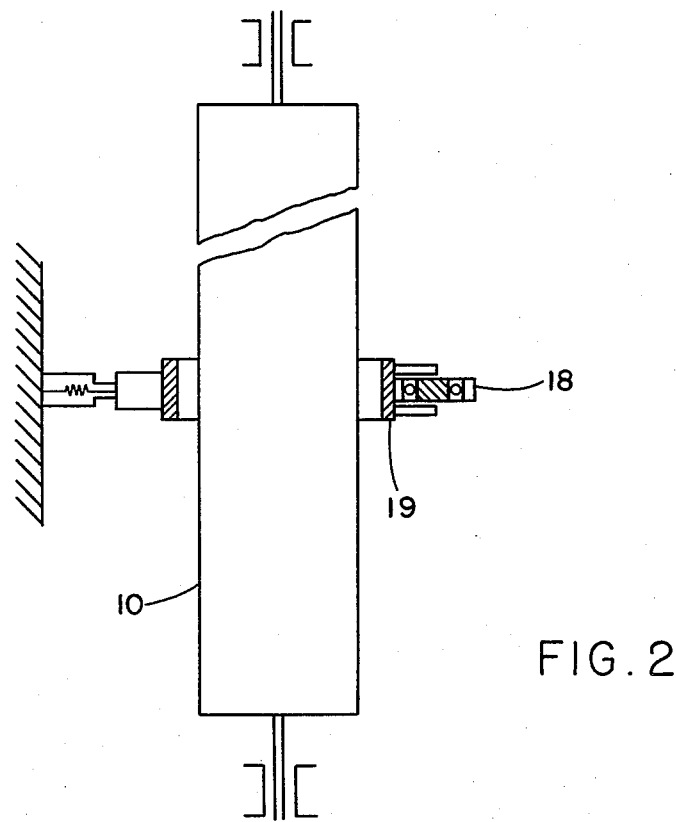
Figure 3:
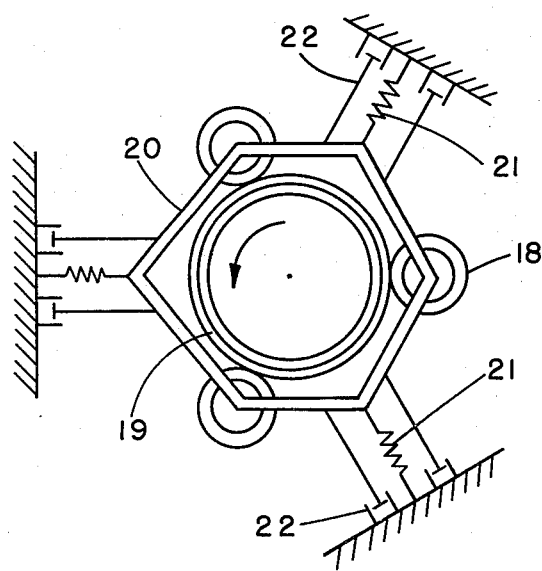
FIG. 3 is a plane view of the embodiment of FIG. 2.

FIGS. 2 and 3 illustrate a further embodiment of the invention in which a ring 19 which is retained through rollers 18 encompasses the rotor sleeve 10 with play therebetween. The rollers 18 are supported on a frame 20 which, in turn, is fastened to a stationary housing by means of springs 21 and attenuators or dampers 22. For extremely lengthy rotors, a plurality of these arrangements can be provided along the rotor sleeve, which are preferably located at positions which the rotor evidences oscillating nodes.

Figure 4:
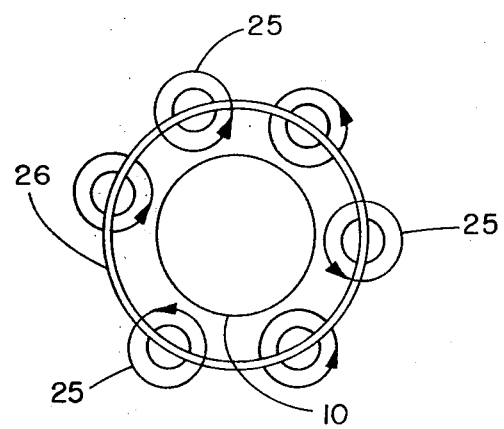
FIGS. 4 through 10 show further embodiments of the invention.

In lieu of the ring 19, pursuant to FIG. 4 of the drawings, there can be provided rollers 25 which are rotably supported on a resiliently supported and dampingly rigidly connected ring 26. The rollers can additionally be driven.

Figure 5:
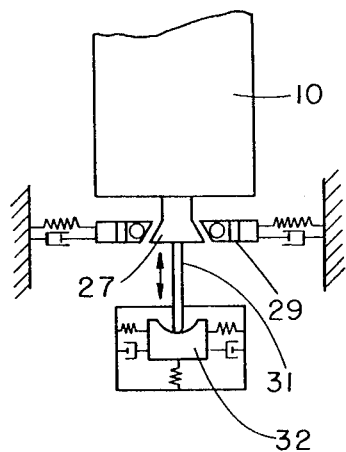
Figure 6:
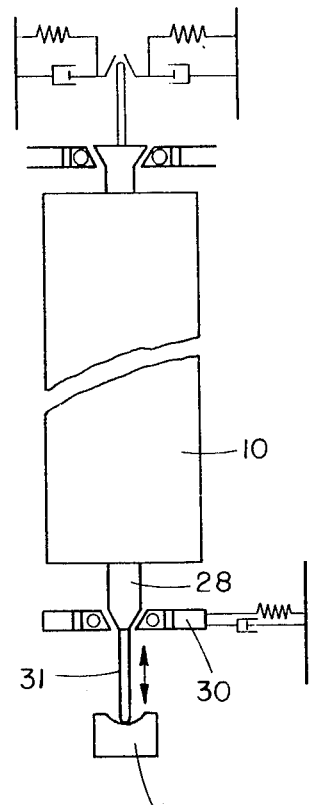

According to FIGS. 5 and 6, the rotor 10 is presently provided with conical projection 27, respectively 28, having associated therewith a ring 29, respectively 30, with a conical inner sleeve. The rotor 10 is supported, by means of a bearing hub 31, in a support cup 32. Upon the exceeding of a predetermined amplitude, the rotor is slightly raised in its support cup 32 and hereby, according to FIG. 5, the projection 27 thereof is pressed against the ring 29 and radially gripped, whereas according to FIG. 6, the projection 28 thereof is raised out of the ring 30 and thereby freed.

For freely supported rotors there can thus be obtained a sufficient degree of stabilization and also through change in the bearing rigidity.

Figure 7:
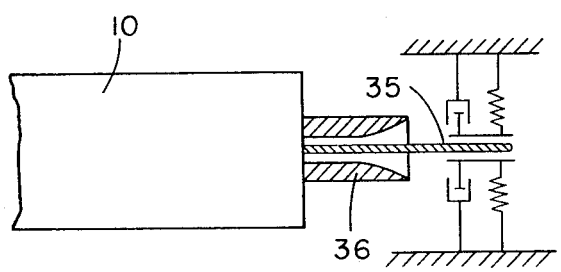
Figure 8:
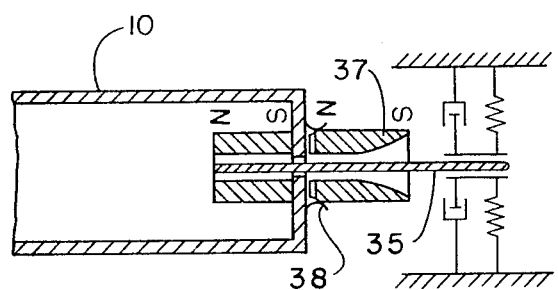

Illustrated in FIGS. 7 and 8 are examples of the embodiments which the rotor 10 is elastically and dampingly supported by means of a bendable or flexible axis 35, wherein the axis 35 determines the bearing rigidity. Provided herein as the traversing aid is a hollow cylinder 36, respectively 37, which encompasses the needle-like axis 35 and whose inner diameter increases towards the end of the needle 35. During flexural oscillations, in accordance with the extent of the amplitudes, the needle 35 leans more or less against the inner wall of the hollow cylinder 36. The bearing rigidity, which is changed in this manner, also leads to a displacement or shifting of the critical rotational speed.

According to FIG. 7, this hollow cylinder 36 is rigidly interconnected with the rotor. In the variation according to FIG. 8, the hollow cylinder 37 is coupled to the rotor 10 by means of magnetic forces, in such a manner, as to snap out from one side out of a snap lock arrangement 38 when the oscillation exceeds a predetermined amplitude. Hereby, the rigidity or stiffness is suddenly changed, in view of which the critical frequency, respectively the amplitude, of the rotor changes in the direction of reduction, and the hollow cylinder again couples on in response to the magnetic forces.

Figure 10:
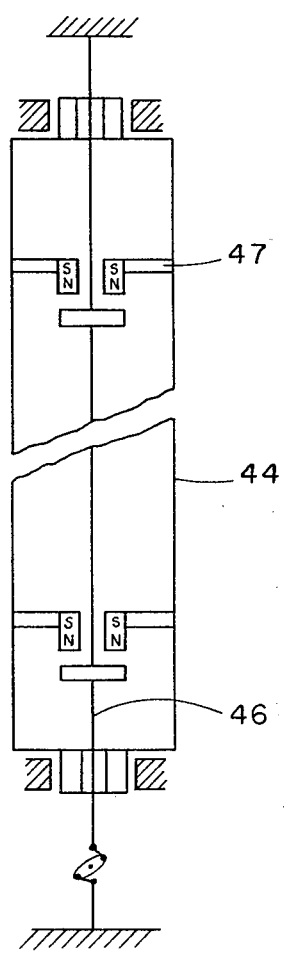
Figure 9:
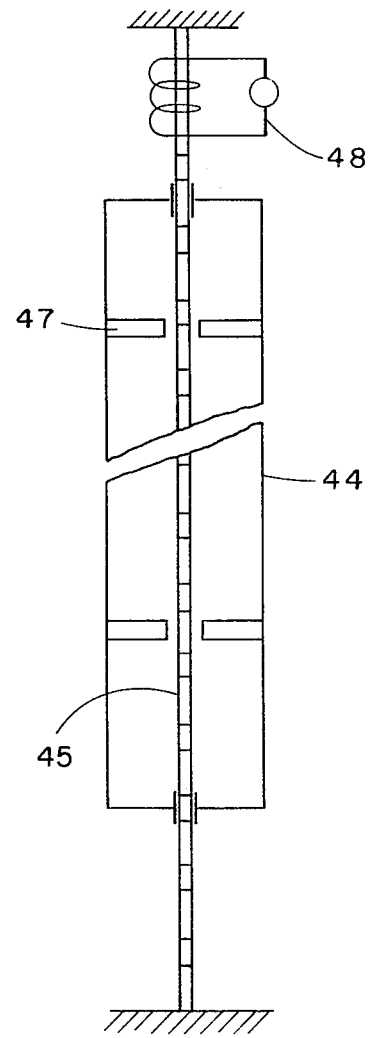

Illustrated in FIGS. 9 and 10 of the drawings are rotors 44 which are constructed as hollow bodies. Located in the plane of the rotational axis is a damping or attenuating chain 45, respectively 46, which at operating rotational speed or intermediate the critical oscillation rotational speeds do not or only lightly touch the means which are connected to the rotor 47, for example, discs or spoked wheels with bores centrally thereof, whereas at the critical rotational speeds when the amplitudes of the rotor increase, they contact these means and are moved along therewith in radial and tangential directions. The chain 45, as shown in FIG. 9, is provided at one end thereof with an electromagnet 48 which, through the switching-in or-switching out of magnetic pull and/or coupling forces can produce a stiffening or, respectively, loosening of the chain.

In the embodiment according to FIG. 10, the chain 4 is connected through the application of magnetic forces with the rotor or, respectively, the means 47. Hereby, the stiffness of the chain can be changed in that, for example, a pull is exerted at one end, which can be effectuated by means of a cam or through magnetic forces.

Through suitable spreader or packing devices, in these embodiments there can additionally be coupled masses, dampers and/or springs to the chain and, respectively, uncoupled therefrom. Such damper chains with low rigidity are preferably employed in vertically extending rotors, but are also applicable for use in any other position of the rotors when the support and rigidity of the damping chain is so selected that, in the operating condition, no hinderance of the rotor takes place.

For multiply supercritical rotors it can be suitable that the increase in the amplitudes at predetermined locations of the rotor is so utilized through suitable sensors as to afford suitable arrangements which provide for a change in the restraining requirements of the rotor at the suitable locations. In the exemplary embodiments there are illustrated mechanical arrangements. Naturally, these can also be electromagnetic or various combination types. For this purpose, there can be supplied to the arrangements the particular rotational speeds through suitable take-offs directly from the rotor, and through known control apparatus the type of traversing aid optimally correlated with the oscillating conditions. Additionally, the drive power output for the rotor can hereby be changed and the traversing supported. For acceleration and deceleration, a different program control may be suitable, and stored in the control apparatus.

What is claimed is:

1. In a method for the traversing of the critical rotational speeds of elongate rotors, the improvement comprising alternately coupling in and uncoupling to said rotor at least one critical frequency altering means positioned substantially at an end of the elongate rotor, which is held by at least one stationary support member and encompasses but does not contact nor influence the rotor during noncritical running speeds of the rotor, directly responsive to radial rotor movement and due to variation in the flexural axis of the rotor upon approach of the rotor speed to the critical rotational speeds thereof, said critical frequency altering means being coupled to said rotor at a critical rotational speed and producing a change in at least the frequencies of the critical rotational speeds, their amplitudes, or the critical rotational speeds and their amplitudes.

2. A method as claimed in claim 1, said critical frequency altering means comprising at least one spring.

3. A method as claimed in claim 1, said critical frequency altering means comprising at least one damper.

4. A method as claimed in claim 1, said critical frequency altering means comprising at least one mass.

5. A method as claimed in claim 1, said critical frequency altering means comprising a combination of springs, dampers and masses.

6. A method as claimed in claim 1, comprising initiating activation and deactivation of said critical frequency altering means through the amplitude change of the rotor at the locations of flexural nodes.

7. A method as claimed in claim 1, comprising initiating activation and deactivation of said critical frequency altering means through the amplitude change at at least one end of said rotor.

8. A method as claimed in claim 1, said rotor being axially displaced by said amplitude change upon approaching a critical rotational speed, comprising coupling and uncoupling said critical frequency altering means to and from said rotor responsive to the axial displacement of the latter.

9. A method as claimed in claim 1, comprising withdrawing energy from said rotor through a damper upon contact with said critical frequency altering means.

10. A method as claimed in claim 1, one portion of the rotor initially increasing in rigidity with increasing amplitude and suddenly assuming another or original rigidity value.

11. A method as claimed in claim 1, one portion of the rotor initially decreasing in rigidity with increasing amplitude and suddenly assuming another or original rigidity value.

12. In an arrangement for the stabilizing of an elongate rotor by traversing the critical rotational speeds thereof, the improvement of critical frequency altering means held by at least one stationary support member and arranged coaxially with and at predetermined close spacing to a portion of said rotor substantially at an end thereof in a noncontacting and noninfluencing manner at noncritical rotational speeds, said traversing aid means being directly coupled to and uncoupled from said rotor responsive to amplitude increases of said rotor, said critical frequency altering means being coupled to said rotor at a critical rotational speed and producing a change in at least the frequencies of the critical rotational speeds, their amplitudes, or the critical rotational speeds and their amplitudes.

13. An arrangement as claimed in claim 12, said critical frequency altering means means comprising at least one spring.

14. An arrangement as claimed in claim 12, said critical frequency altering means comprising at least one damper.

15. An arrangement as claimed in claim 12, said critical frequency altering means comprising at least one mass.

16. An arrangement as claimed in claim 12, said critical frequency altering means comprising a combination of springs, dampers and masses.

17. An arrangement as claimed in claim 12, said critical frequency altering means engaging said rotor radially thereof.

18. An arrangement as claimed in claim 12, comprising means for regulating the rigidity, mass or extent of damping of said critical frequency altering means responsive to the rotational speed of said rotor.

19. An arrangement as claimed in claim 18, said regulating means comprising means for producing magnetic coupling forces.

20. An arrangement as claimed in claim 12, said critical frequency altering means being adapted to auxiliary drive said rotor during acceleration of the latter and brake said rotor during deceleration thereof.

21. An arrangement as claimed in claim 12, said critical frequency altering means engaging said rotor.

22. An arrangement as claimed in claim 12, said critical frequency altering means comprising means encompassing said rotor with predetermined play therebetween; and resilient means fastened to a stationary frame rotatably supporting said means but not being rotatable therewith.

23. An arrangement as claimed in claim 22, said encompassing means comprising a ring.

24. Arrangement as claimed in claim 22, said rotor-encompassing means including a conical contact surface; a complementary member on said rotor engaging in said conical surface upon said rotor displacing in an axial direction when approaching a critical rotational speed.

25. Arrangement as claimed in claim 22, said rotor-encompassing means being driven in an uncoupled condition intermediate the critical rotational speeds of the rotor at a corresponding speed so as to accelerate said rotor upon contact therewith and to retard the rotor during deceleration.

26. Arrangement as claimed in claim 12, said encompassing means comprising a plurality of dampingly and resiliently supported rollers uniformly arranged about said rotor.

27. Arrangement as claimed in claim 12, said rotor including a needle-like projection, said critical frequency altering means comprising a hollow cylinder encompassing said projection, said hollow cylinder having an inner diameter reducing towards the free end of said projection.

28. Arrangement as claimed in claim 12, said critical frequency means being arranged interiorly of said rotor.

29. Arrangement as claimed in claim 28, said critical frequency altering means having its rigidity changed interiorly of said rotor so as to influence the frequencies and amplitudes of said rotor during traversing of critical rotational speeds in a predetermined direction.

30. Arrangement as claimed in claim 28, said critical frequency altering means comprising a damping chain, and means for changing the rigidity of said chain through varying of pulling forces in the axial direction of said chain.

31. Arrangement as claimed in claim 12, comprising a plurality of said critical frequency altering aid means being spaced along the length of said rotor.

32. Arrangement as claimed in claim 31, said critical frequency altering means being located at the oscillation nodes of said rotor.

* * * * *